July 29, 1941.   M. B. BENSON   2,250,985
TOWING MACHINE
Filed July 8, 1939   4 Sheets-Sheet 1

INVENTOR.
Melvin B. Benson
BY
Gifford, Scull & Burgess
ATTORNEYS

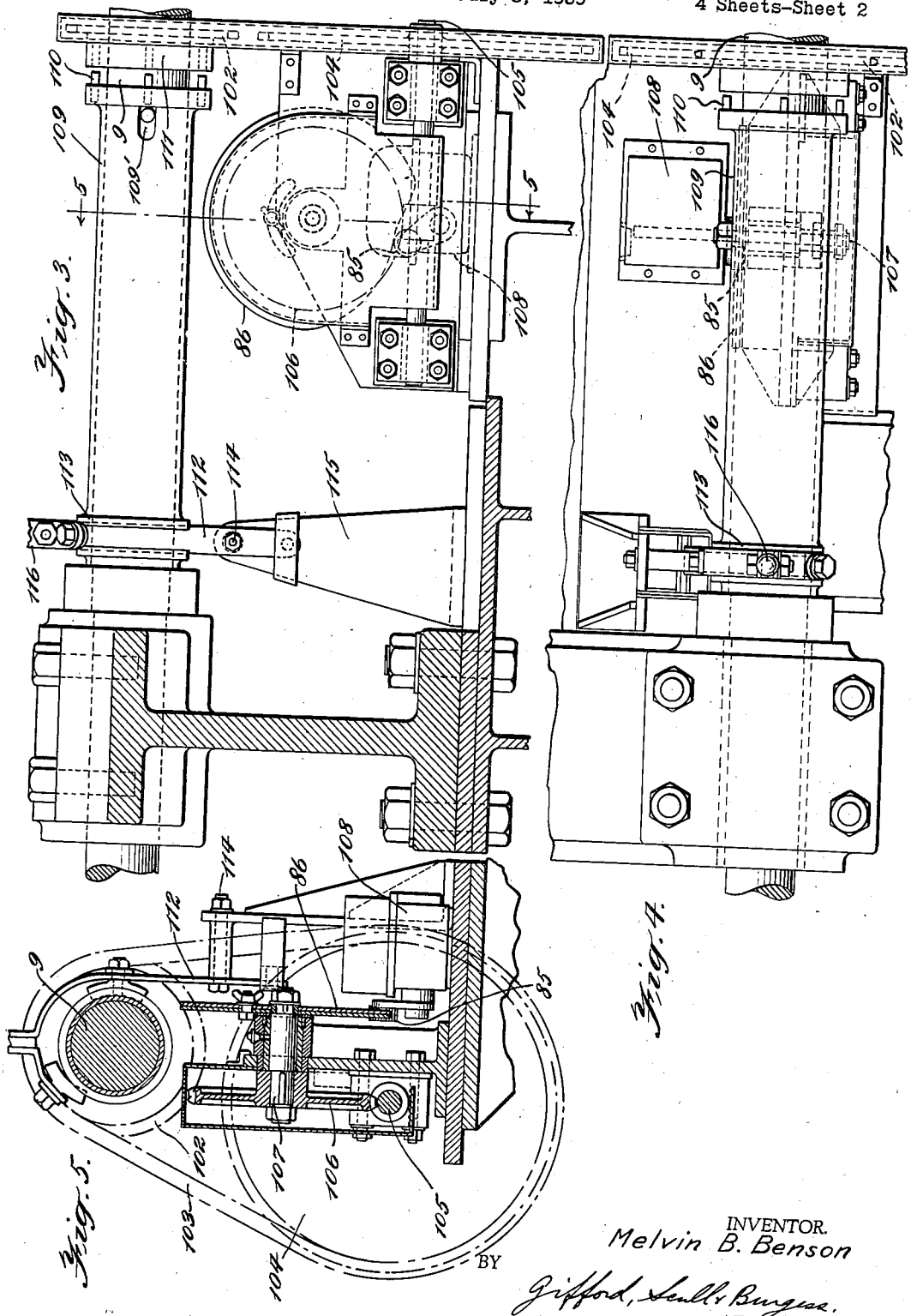

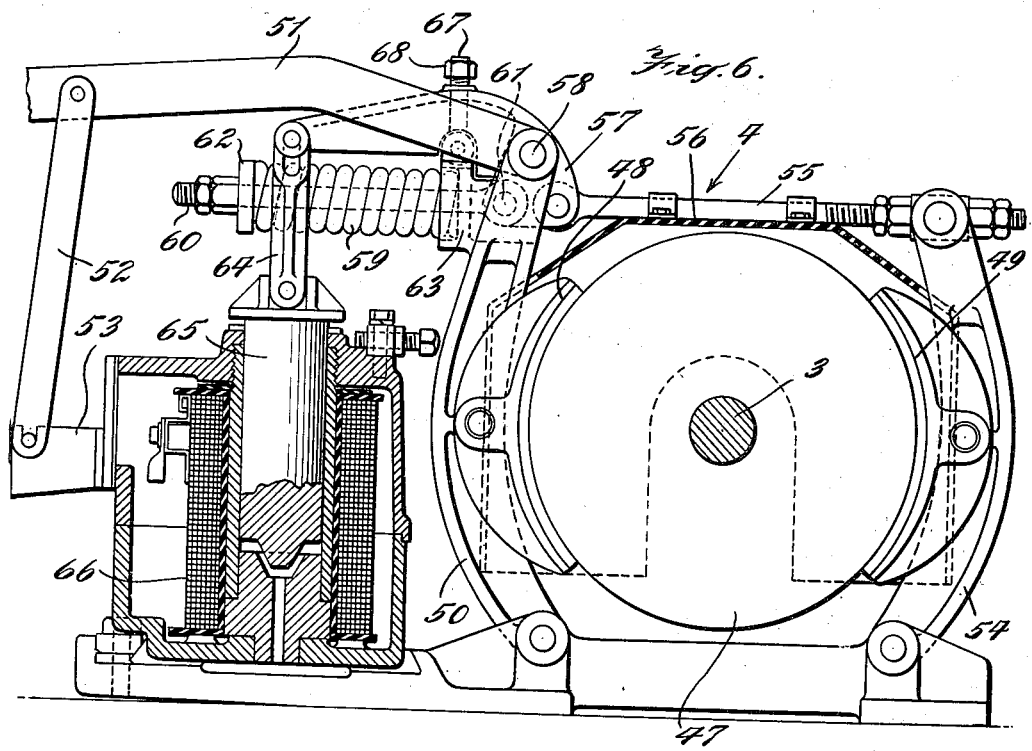
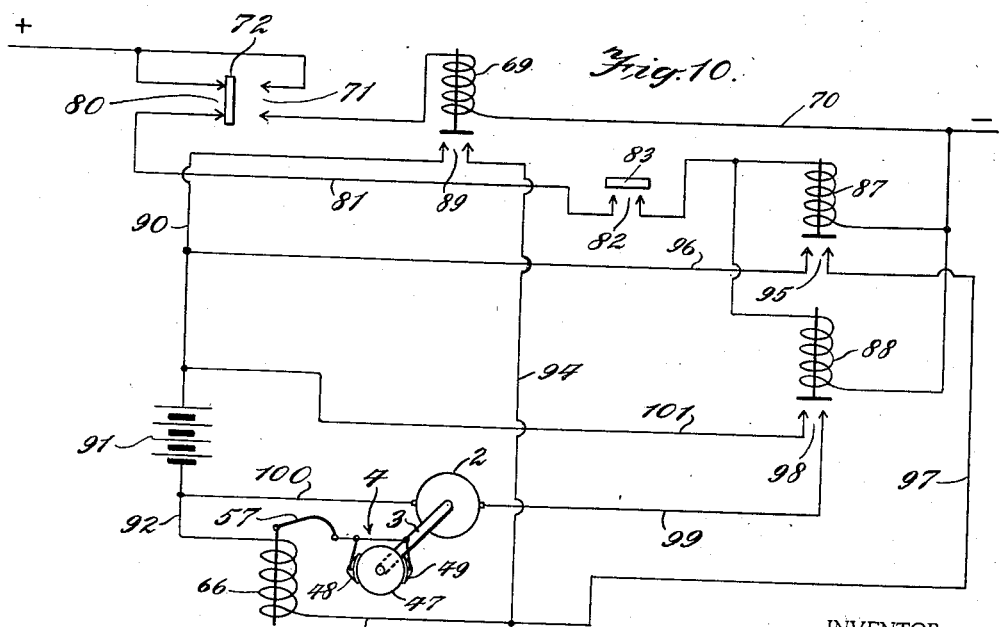

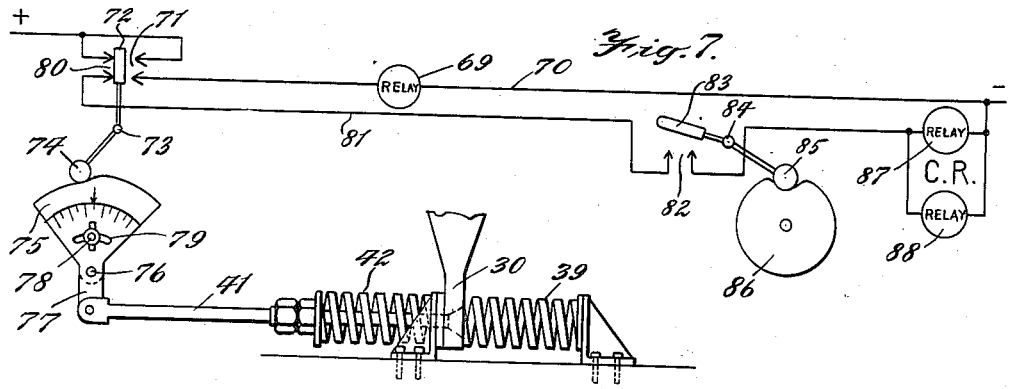
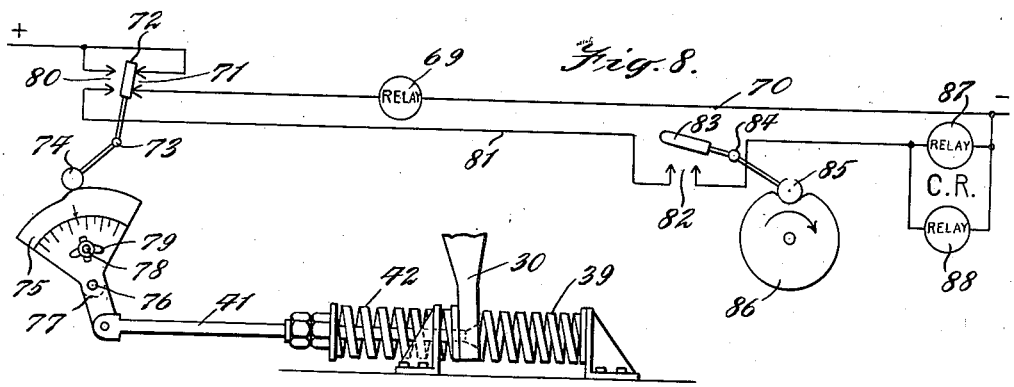
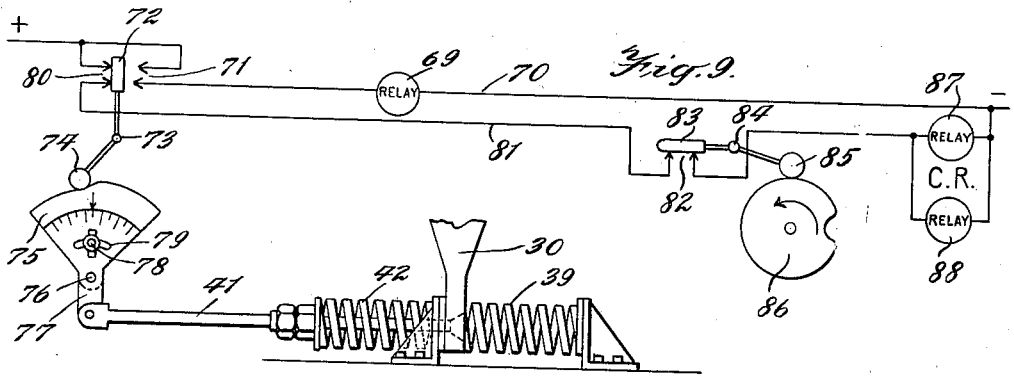

Patented July 29, 1941

2,250,985

UNITED STATES PATENT OFFICE 2,250,985

TOWING MACHINE

Melvin B. Benson, Scotch Plains, N. J., assignor to Lidgerwood Manufacturing Company, Elizabeth, N. J., a corporation of New York Application July 8, 1939, Serial No. 283,445

2 Claims. (Cl. 254—172)

This invention relates to a towing machine and more particularly to a novel and improved arrangement for automatically controlling the tension on a tow cable wound on the cable drum of the machine. The invention will be better understood from the following description and the annexed drawings, in which I have shown a selected embodiment of the invention and in which:

Fig. 3 is a view on an enlarged scale taken approximately on the line 3—3 of Fig. 2;

Fig. 4 is a plan view of the apparatus shown in Fig. 3;

Fig. 5 is a view approximately on the line 5—5 of Fig. 3;

Fig. 6 is a view on an enlarged scale taken approximately on the line 6—6 of Fig. 2;

Figs. 7, 8, and 9 are diagrams illustrating the operation of the invention;

Fig. 10 is a wiring diagram showing one way in which certain parts may be operated electrically.

Figure 1:
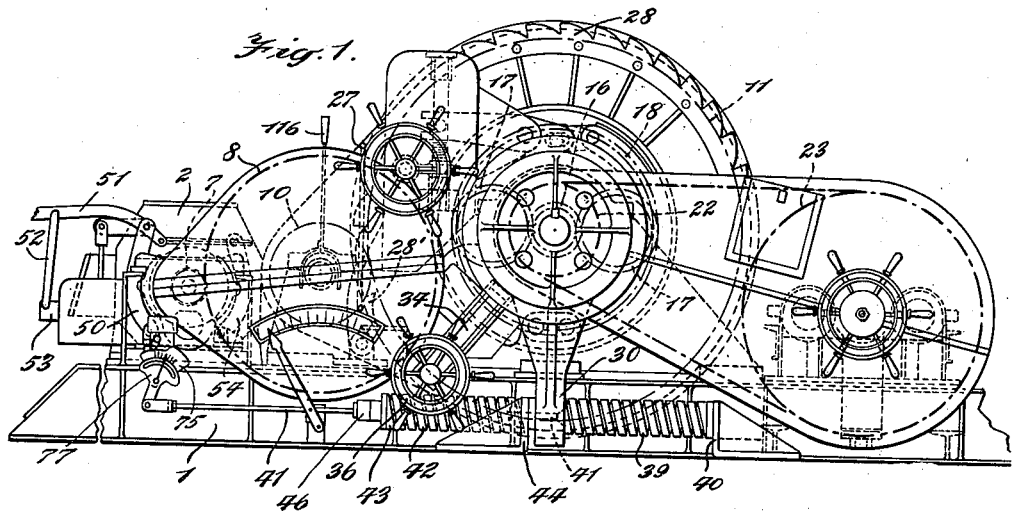
Fig. 1 is an elevation of a towing machine having my invention applied thereto.
Figure 2:
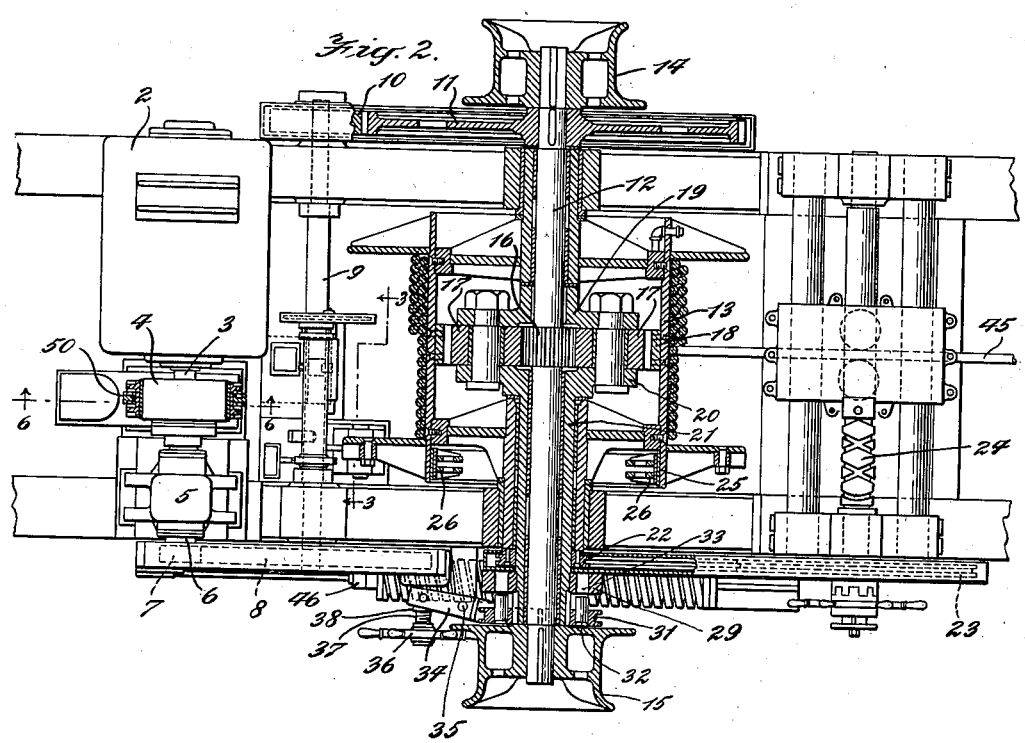
Fig. 2 is a horizontal view of the machine appearing in Fig. 1, parts being broken away and parts shown in section, better to illustrate the operation.

Referring first to Figs. 1 and 2, the invention is shown as used in conjunction with a towing machine mounted on a suitable bedplate 1 and comprising an electric motor 2 having a shaft 3 extending through a braking apparatus 4 to a transmission 5. The details of the braking mechanism will be referred to later, but the details of the transmission are not necessary to an understanding of the invention and therefore will not be discussed further. This transmission is or may be standard construction, for example the kind of transmission known as the Cotta transmission, and the effect thereof is to rotate a shaft 6 at any one of several selected speeds. The shaft 6 has thereon a pinion 7 meshing with a gear 8 on a shaft 9 which has on its other end a pinion 10 meshing with a gear 11 keyed to a shaft 12 which extends centrally through the cable drum 13.

The drum is shown as being driven from the shaft 12 by a differential drive, here illustrated as a planetary transmission, this arrangement being more fully described and claimed in my copending application, Ser. No. 147,857, filed June 12, 1937. Keyed to the opposite ends of the shaft 12 are the usual so-called "Gypsy" heads 14 and 15.

The transmission is shown as comprising a sun gear 16 meshing with planetary pinions 17 which in turn mesh with an internal gear 18 secured to the inner surface of the drum 13. These planetary pinions are supported between two spiders 19 and 20, the spider 20 having a sleeve 21 bearing on the shaft 12 and extending beyond one end of the drum. This sleeve may rotatably carry a pulley 22 over which may run a belt to the pulley 23 on the double threaded shaft 24 of a traverse mechanism which is indicated in Figs. 1 and 2. Since the details of this mechanism are not necessary to an understanding of the invention claimed herein, they will not be further discussed.

Near one end of the drum there is provided a brake band 25 engaging brake shoes 26 which may be operated by hand from a wheel 27, as known in the art. Also, the drum may be provided with a rack 28 adapted to cooperate with a pawl 28' to hold the drum against rotation and to supplement the brake.

The apparatus previously described is either known in the art or is described in my aforesaid copending application.

Rotatably mounted on the end of the sleeve 21 is the head 29 of a control arm 30. For convenience, this arm is shown as extending downwardly to a position adjacent the bedplate. The head of the arm may be clutched to the sleeve 21 as by means of a clutch collar 31 splined on the sleeve, as indicated in Fig. 2. This collar has clutch pins 32 adapted to be received in holes 33 in the head 29 and may be slid on the sleeve as by means of a lever 34 pivoted at 35 on the frame and moved as by means of a handwheel 36 which is shown as mounted on a threaded stem 37 having engagement with a nut 38 pivoted to the lever 34.

The lower end of the arm 30 presses against a compression spring 39 which is disposed between the arm and an abutment 40 secured to the bedplate. The arm is also secured to a rod 41 which passes through a second compression spring 42, this spring being compressed between an abutment 43 on the rod 41 and an abutment 44 on the bedplate.

It will be understood that usually the towing machine is used in marine work to tow one vessel from another, although the invention may be applicable to other situations. It will be assumed, however, that the machine is used on shipboard and, assuming that a tow cable 45 is wound on the drum 13 and has its other end connected to a tow, then the drum may be held against rotation by the brake 26 and the pawl 28' if desired. Usually, when the sea is smooth, such control of the drum may be sufficient, because then there is no great tendency to change the tension of the cable. However, when the sea is not smooth, variations in tension take place in surges, as is known, and then it is highly desirable to have an automatic control to permit the paying out of the cable when an excessive tension is put on it and to cause reclaiming and rewinding of the cable thus paid out. For that purpose, I make use of electrical apparatus connected to and controlled by the control arm 30. When that automatic control is used, of course it will be understood that the brake 26 and the pawl 28' will be made inoperative.

The springs 42 and 39 act together on the arm 30 and, by arranging these springs in line, as shown, it is possible to get the effect of a heavy spring, in a manner which is more economical, particularly of space, than if a single large spring had to be used. Both springs resist tension on the cable, this tension being transmitted to the springs through the differential drive, as will be plain to those skilled in the art. In other words, any tension on the cable will tend to cause a rotation of the sleeve 21 in a counterclockwise direction (as viewed in Fig. 1) and thus compress the springs through the arm 30 which, for automatic tension control, will be clutched to the sleeve. The springs are made heavy enough so that no substantial movement of the arm 30 will be permitted for ordinarily slight variation in tension on the cable, but when the tension exceeds a predetermined amount, the arm will move to compress the springs. The force exerted by the springs may be controlled by adjusting the nuts 46 threaded on the rod 41. Thus it will be seen that the springs act as a buffer as well as a means for controlling the operation of the control mechanism.

I shall now describe the control mechanism to which reference has been made above and for that purpose I shall refer particularly to Figs. 3 to 9, inclusive.

Referring in particular to Fig. 6, I have shown details of the electric brake which is designated generally at 4 in Fig. 2. This mechanism comprises a brake wheel 47 mounted on the motor shaft 3 and contacting with a pair of brake shoes 48 and 49. The shoe 48 is supported on a lever 50 pivoted at the bottom on the bedplate and connected to a link 51 which rests on a rock arm 52 supported on a bracket 53 in such a way that the brake shoe may be moved radially away from the brake wheel. The shoe 49 is pivoted on a lever 54, the lower end of which is pivoted to the bedplate, as indicated, and the upper end of which is pivotally connected to a rod 55 slidably mounted on the brake housing 56 and connected to one end of a lever 57 which is pivoted at 58 to the upper end of the lever 59. The lever 57 is normally urged to rotate in a clockwise direction around the pivot 58 by means of a spring 59 surrounding a rod 60 pivoted to the lever 57 at 61. The spring acts between an abutment 62 on the rod and an abutment 63 on the lever 50. The other end of the lever 57 is connected by a link 64 to the core 65 of a magnet 66.

By the above described arrangement, the brake shoes 48 and 49 are normally held in contact with the brake wheel 47 by means of the spring 59 which tends to urge the shoes towards each other. Upon energizing of the magnet, however, the core 65 is pulled down and forces the shoes apart against the action of the spring 59. If desired, a lock may be provided for locking the brake in released position. For example, I may provide a rod 67 secured to the abutment 63 and passing through the lever 57. The outer end of this rod is threaded to receive a nut 68 and, when this nut is clamped down against the lever 57, the shoes 48 and 49 will be held away from the brake wheel.

The magnet 66 may be energized by suitable connections from a relay 69 (Figs. 7–9). The details of this relay and of its connections to the magnet may take various forms and one arrangement will be described later. For the moment it is sufficient to say that the relay 69 is placed in an electric line 70 in which is a switch 71 adapted to be closed by a contact member 72. This contact member is mounted on a pivot 73 and is controlled by a roller 74 adapted to engage the surface of a cam 75. This cam is pivoted at 76 and is operated by an arm 77 also pivoted at 76 and secured to the cam by means of a bolt 78 which is secured to the arm and which passes through an arcuate slot 79 in the cam so that the cam may be adjusted with respect to its pivot. The arm 77 is pivotally connected to the rod 41.

The member 72 is normally in position where the switch 71 is open, as shown in Fig. 7, and it will be closed when excessive tension is exerted on the cable, which in turn will cause pulling of the rod 41 to the right. Upon closing of the switch 71, the relay 69 will be actuated to energize the magnet 66.

The contact member 72 also is used to control another switch 80 which is normally maintained closed, as indicated in Fig. 7. This switch is in a line 81 which contains another switch 82, this switch being normally open, as shown in Fig. 7, being adapted to be closed by a contact member 83. This member is mounted upon a pivot 84 and controlled by a roller 85 operated by a cam 86. In the line 81 is also a pair of relays 87 and 88, energizing of which will release the brake 4 and start the motor 2 to wind up the cable on the drum.

While, as noted above, various arrangements may be used for connecting the relays and other parts, nevertheless I have shown diagrammatically in Fig. 10 one possible arrangement, assumed to be operated by D. C., although of course other circuits may be devised using A. C. In that figure, certain elements are given the same numerals as in other figures, and those parts will not be further described. In addition, however, I have indicated the relay 69 as comprising a switch 89 in a circuit which includes a conductor 90, a source of electric power indicated diagrammatically as a battery 91, and a conductor 92 leading to one end of the winding of the magnet 66, the other end of the magnet being connected by conductors 93 and 94 to the other side of the switch 89.

I have also illustrated the relay 87 as comprising a switch 95 from one side of which leads a conductor 96 to the conductor 90 and thence to one side of the battery 91. From the other side of the switch 95, I have shown a conductor 97 connected to the conductor 93 and thence to the magnet 66. I have also shown the relay 88 as comprising a switch 98, from one side of which leads a conductor 99 to one side of the motor 2, the other side of the motor being connected through the battery to the switch 98 by means of conductors 100, 92, 90, and 101.

The above described electric circuit is a convenient and simple one, although obviously other arrangements may be readily devised by those skilled in the electrical art.

The cam 86 may be operated by any suitable arrangement in proper timed relation to the rotation of the drum and, in the illustrated embodiment, the cam is rotated from the shaft 9 by an arrangement best shown in Figs. 2, 3, 4, and 5.

The shaft 9 is positively driven from the motor as previously described and on this shaft is rotatably mounted a sprocket 102 over which runs a chain 103 meshing with a sprocket 104 on a stub shaft 105. This shaft carries a worm meshing with a worm gear 106 on a cam shaft 107 on which is adjustably mounted the cam 86. This cam, as noted before, engages a roller 85, and the parts operated by that roller may conveniently be housed in a box 108. Since the mode of operation of these parts is sufficiently shown in the diagrammatic views, no attempt has been made to indicate their details in Figs. 2, 3, 4, and 5.

The shaft 9 may be clutched to the sprocket 102 as by means of a clutch sleeve 109 which is slidable on but rotatable with the shaft 9 and which carries pins 110 adapted to be received in holes in a collar 111 fixed to the sprocket, the sprocket being rotatably mounted on the shaft, as noted above. The sleeve 109 may be moved lengthwise of the shaft 9 to engage or disengage the clutch as by means of a shift lever 112 engaging a collar 113 on the sleeve. This lever may be pivoted at 114 on a suitable standard 115 and may be provided with a handle 116, as shown in Figs. 1 and 4. The shaft 9 and sleeve 109 are caused to rotate together as by the pin and slot arrangement indicated at 109'.

In operation, and assuming that the sea is quiet so that no surge or excessive pull takes place on the cable, the cable will have been paid out to the proper length in the usual way, the transmission 5 being placed in neutral for that purpose. After the proper length has been paid out, the transmission 5 is operated to connect the motor to the drum and other usual steps taken to see that the cable is in proper position and condition. The control arm 30 will be disconnected from the drum transmission, as shown in Fig. 2, and the drum may be held by the brake 26 and the pawl 28'. However, when the automatic control is to be used, the brake 26 and pawl 28' are released, the control arm 30 is clutched to the sleeve 21 as by operation of the handwheel 36, and the cam 86 is also made operative by clutching the sprocket 102 to the shaft 9 as by operation of the handle 116. The parts shown in Figs. 7, 8, 9, and 10 will then be in the position shown in Figs. 7 and 10 and ready for automatic operation.

So long as no surge takes place, nothing will happen, since the springs 39 and 42 are of such strength and are so adjusted as to hold the control arm 30 and consequently the drum 13 against any substantial movement. At the same time the brake 4 is set and the motor is not operating, since the switch 98 is open and any other hand-operated switches for controlling that motor are closed.

Now assume that a surge takes place which is of such an amount as to cause the control arm 30 to move to some such position as indicated in Fig. 8 or at least enough so that the cam 75 will lift the roller 74 and close the switch 71, at the same time of course opening the switch 80. The relay 69 will at once be operated to energize the magnet 66 and release the brake on the motor shaft 3 so that the motor may be overhauled by the excessive tension in the cable, thereby reducing pull to the predetermined setting. The cam 86 has started to rotate in the direction of the arrow in Fig. 8, lifting the roller 85 and closing the switch 82. The line 81 for the relays 87 and 88 is thus closed at the switch 82, but has been opened at the switch 80.

As the tension returns to normal upon subsiding of the surge, the cam 75 will return to its initial position, as indicated in Fig. 9, thus once more opening the switch 71 and closing the switch 80, the latter in turn completing the circuit through the line 81 and the relays 87 and 88. Energizing of the relay 87 will close the switch 95 so as to energize the magnet 66 and hold the brake controlled thereby in released position, while energizing of the relay 88 will close the switch 98 and cause operation of the motor 2, in order to reclaim the cable which has been paid out, it being understood that the motor is reversible. During this reclaiming of the cable, the cam 86, since it is operated from the motor shaft, and consequently in synchronism with the motor shaft and drum, will rotate in the opposite direction to what it was rotating before (as shown in Fig. 9) until the roller 85 once more is permitted to drop, thus opening the switch 82. Then the motor will be stopped, the magnet 66 will be de-energized, and the spring 59 will reset the brake 4. In the meantime, however, the switch 82 has been kept closed long enough for the motor to operate the drum to reclaim the same length of cable which has been paid out. The amount of rotation of the cam 86 in one direction is substantially equal to its rotation in the opposite direction, and the switch 82 is maintained closed long enough for the paid out cable to be reclaimed. It will be noted that, since the cam 86 rotates equal angular amounts in opposite directions during the paying out and reclaiming of the cable, the exact length of cable paid out is always reclaimed and then the switch 82 is opened to stop the motor and reset the brake.

Of course, it will be understood that the various relays will operate against springs which tend to keep the various switches 89, 95, and 98 open and likewise the rollers 74 and 85 may be controlled by springs acting against the cams in a manner well known in the art.

When the brake 4 is released and the surge is taking place, of course it will be understood that the rotation of the drum 13 caused by the paying out of the cable will cause movement of the control arm 30 and the differential drive exemplified by the planetary transmission. Rotation of the drum will likewise cause rotation of the shaft 12 which will be transmitted through the shaft 9 to the motor and thus generate electric current, which generation acts as a dynamic brake on the drum shaft. For example, the parts may be so designed that something on the order of 40 or 50 feet of cable may be paid out as the result of one surge, and the cam 86 and the parts operating it are so designed that substantially more than that length of cable may be paid out before one complete rotation of the cam takes place.

While I have shown the invention as embodied in a specific form, it is to be understood that various changes in details may be made without departing from the scope of the invention as defined by the appended claims.

I claim:

1. In a towing machine, a motor, a cable drum, a shaft driven by said motor and extending through said drum, a planetary-type driving transmission operatively connecting said shaft and said drum, said transmission having a planet gear supporting arm, a brake normally holding said motor against operation, a control arm adapted to swing about said shaft as a center, said control arm being operatively connected to said planet gear supporting arm, means to disconnect the operative connection between the two arms, a spring yieldingly holding said control arm against movement by said planet gear supporting arm, and means actuated by movement of said control arm against said spring to release said brake and to allow said drum to pay out cable.

2. In a towing machine, a motor, a cable drum, a shaft driven by said motor and extending through said drum, a planetary-type driving transmission operatively connecting said shaft and said drum, said transmission having a planet gear supporting arm, a brake normally holding said motor against operation, a control arm adapted to swing about said shaft as a center, said control arm being operatively connected to said planet gear supporting arm, a spring yieldingly holding said control arm against movement by said planet gear supporting arm, an electric circuit having two switches therein, the first switch being normally closed and controlled by said control arm, the second switch being normally open, a rotary cam controlling said second switch and operating in synchronism with the drum, movement of said control arm against said spring opening said first switch and movement of said cam in synchronism with the paying-out rotation of the drum positively closing said second switch, means, actuated when said spring returns said control arm to normal position and closes said first switch, to operate said motor to rotate said drum to reclaim the cable paid out, said cam permitting said second switch to open when the amount of cable paid out has been reclaimed, means actuated on the opening of said first switch by the control arm to release said brake, and means actuated on the opening of said second switch, after the said first switch is closed, to allow the setting of said brake.

MELVIN B. BENSON.